Figure 1:
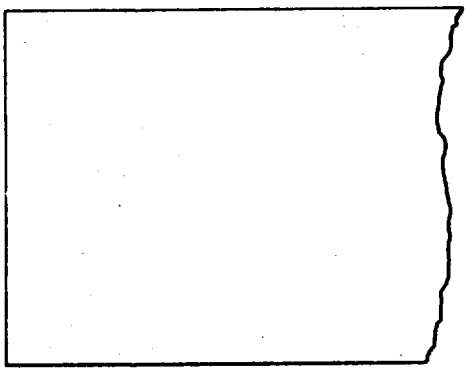

J. F. MARSH.

Manufacture of Ornamental Paper.

No. 8,543. Reissued Jan. 21, 1879

WITNESSES:

Penn Halsted

W. P. Cowl

INVENTOR:

John F. Marsh by John J. Halsted, his Atty.

UNITED STATES PATENT OFFICE.

JOHN F. MARSH, OF SPRINGFIELD, MASSACHUSETTS, ASSIGNOR TO SPRINGFIELD GLAZED PAPER CO., OF SAME PLACE.

IMPROVEMENT IN THE MANUFACTURE OF ORNAMENTAL PAPER.

Specification forming part of Letters Patent No. 203,474, dated May 7, 1878; Reissue No. 8,543, dated January 21, 1879; application filed December 2, 1878.

*To all whom it may concern:*

Be it known that I, JOHN F. MARSH, of the city of Springfield, in the county of Hampden and State of Massachusetts, have invented certain new and useful Improvements in the Manufacture of Ornamental Paper; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to the production of an ornamental paper for covering boxes and for various other kindred purposes; and it consists in the ornamenting of paper surfaces by means of successive coatings and stainings, whereby two or more contrasting colors are produced on the same surface in immediate juxtaposition, in the staining or coloring of a surface or surfaces already coated and smoothed, in the smoothing by pressure or polishing by frictional action of such ornamental surfaces, in the polishing by frictional action or smoothing by pressure of such coated surfaces, and then ornamenting by additional coloring, all as more particularly hereinafter described.

The coating, which may be of any color desired, white or tinted, is not of itself new, but may be any preparation, such as is ordinarily used in making what is usually styled "glazed," or "plated," or "enameled" paper. I mean by "glazed" paper such as, having been first coated, is then polished by means of a flint or by a friction-roll, say, of chilled iron. By "plated" paper I mean such as, having been first coated, is next pressed between metal plates of zinc, steel, or copper, but usually zinc, these plates and their interposed paper being then passed between iron rollers; or, instead of these plates, it may be passed between two rollers, the upper one being of chilled iron and the lower one made of paper or cotton, having a smooth hard surface; and by "enameled" paper I mean such as, being first coated, is next polished by brushing, and then calendered or finished by pressure between plates to harden and smooth the paper.

My present invention is an improvement on the method of ornamenting paper described in my Patent No. 176,232, dated April 18, 1876. In that patent the paper was first coated, next ruled or printed with the desired pattern of line, and then given a polish by pressure or friction; but while by this method comparatively good results were attained, I have found by experience that far more satisfactory results and a finer and more merchantable article is produced by my present improved method, the leading feature of which is to press, smooth, or calender the coated surface prior to the second coloring or printing.

The coating operation leaves the surface of the paper comparatively rough, and the ornamenting, as heretofore done, was directly upon this rough coated surface before giving to such surface any treatment whereby its inequalities are smoothed down or leveled. The ornamenting lines in such cases are necessarily broken and imperfect, thus impairing the whole effect of the ornamentation imparted by the additional color or colors, and this defect is likely to be increased and intensified by each subsequent step of the process and by every handling prior to the final finish. Indeed, the coated surface cannot be ornamented with additional colors successfully in the best manner until it has been smoothed.

There are various ways by which this smoothing may be done—as, for instance, by passing it between rollers, either hot or cold, or by putting the paper in the form of sheets between metal plates, and then passing these plates and their interposed sheets between pressing-rollers; and I prefer this last-named mode of smoothing.

When the coated surface has been thus smoothed, leveled, or reduced by the above or other equivalent means, it is in condition to be successfully ornamented in additional colors or printed; and this may, as stated in my above-named patent, be done either by hand or by means of ruling-machines, such as are employed by blank-book manufacturers; and the lines may be drawn diagonally, straight, or irregularly across the paper, and may cross or recross, and be in any design, pattern, color, or colors, or they may be printed, but preferably drawn. The additional coloring or printing being thus done upon the artificially-smoothed coating, not only are the newly-colored lines more true and unbroken, and therefore more clearly defined, but they take a closer hold upon the coating-surface, and are consequently proportionately more durable and less likely to be defaced either by handling or by the after process of friction-polishing.

To give a final polish I do not apply any varnish or other adhesive material to the paper, but, on the contrary, give it a high luster by mere pressure or by frictional action, or by both if desired. This may be done by means of what is technically known as a "flint" or "stone," the paper passing between the flint and a surface or bed of wood, the flint imparting a rubbing action to the paper; or the frictional polish may be imparted by rotary or other brushes, or by means of rolls, between which the paper is passed, the roll next that face of the paper which is to be polished running much faster than that on the opposite side, or on the side not to be polished.

Instead of ornamenting the surfaced and smoothed paper by additional coloring before the final polishing, the polishing may precede the ornamenting, the successive steps being then as follows, to wit: coating, polishing, and ornamenting by additional color instead of coating, smoothing, ornamenting, and polishing. Thus the ornamenting may precede or follow the polishing. Printing must, however, precede the polishing.

It will be understood that the coating has two objects in view, namely: first, to get a tinted or colored ground, thus introducing upon the surface of the paper the principal tint or color where the object to be attained is a number and variety of colors in the finished article; and, second, to get a surface susceptible of receiving a high polish or luster by means of friction or pressure, or both, after or before being additionally colored by ruling. If desired, there may be a second smoothing—that is to say, next after the additional coloring as well as preceding it.

Figure 2:
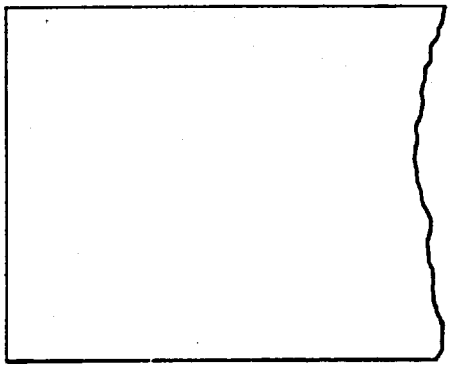
Figure 3:
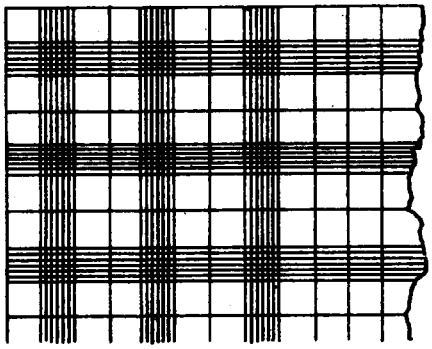
Figure 4:
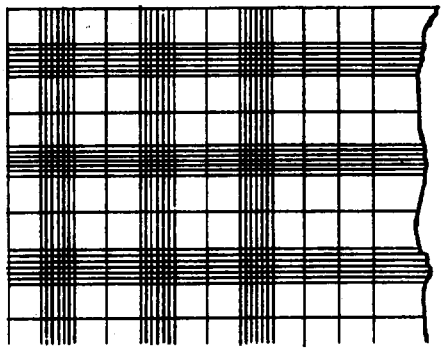
Figure 5:
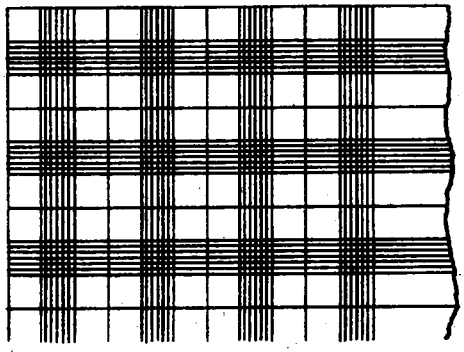

In the accompanying drawings, Figure 1 represents a paper having thereon the preparation or coated surface; Fig. 2, the same after it has had its surface smoothed; Fig. 3, a piece coated, smoothed, and ruled; Fig. 4, a piece coated, smoothed, ruled, and polished by friction; Fig. 5, a piece, coated, smoothed, ruled, and again smoothed.

I claim—

1. The method herein described of manufacturing ornamental paper, the same consisting in first coating the surface, next pressing or smoothing such coated surface, and then ornamenting the same with additional color or colors by ruling the same.

2. The method herein described of manufacturing ornamental paper, the same consisting in first coating the surface, then polishing by frictional action, and finally ornamenting by additional color or colors by ruling.

3. The method herein described of manufacturing ornamental paper, the same consisting in first coating the surface, next pressing or smoothing such coated surface, then ruling the same, and finally polishing by frictional action.

4. As a new article of manufacture, an ornamental paper having a surface coated and ornamented in variegated colors by means as heretofore described, and either smoothed by pressure or polished by frictional action after the first coating and previous to the ornamenting, or finally smoothed by pressure or polished by frictional action after coating and ornamenting.

5. The method herein described of manufacturing ornamental paper, the same consisting in first coating the surface, next pressing or smoothing such coated surface, then either printing or both ruling and printing the same, and finally polishing by frictional action.

JOHN F. MARSH.

Witnesses:
S. S. BAILEY,
JOHN C. GRISWOLD.